Patented Nov. 5, 1935

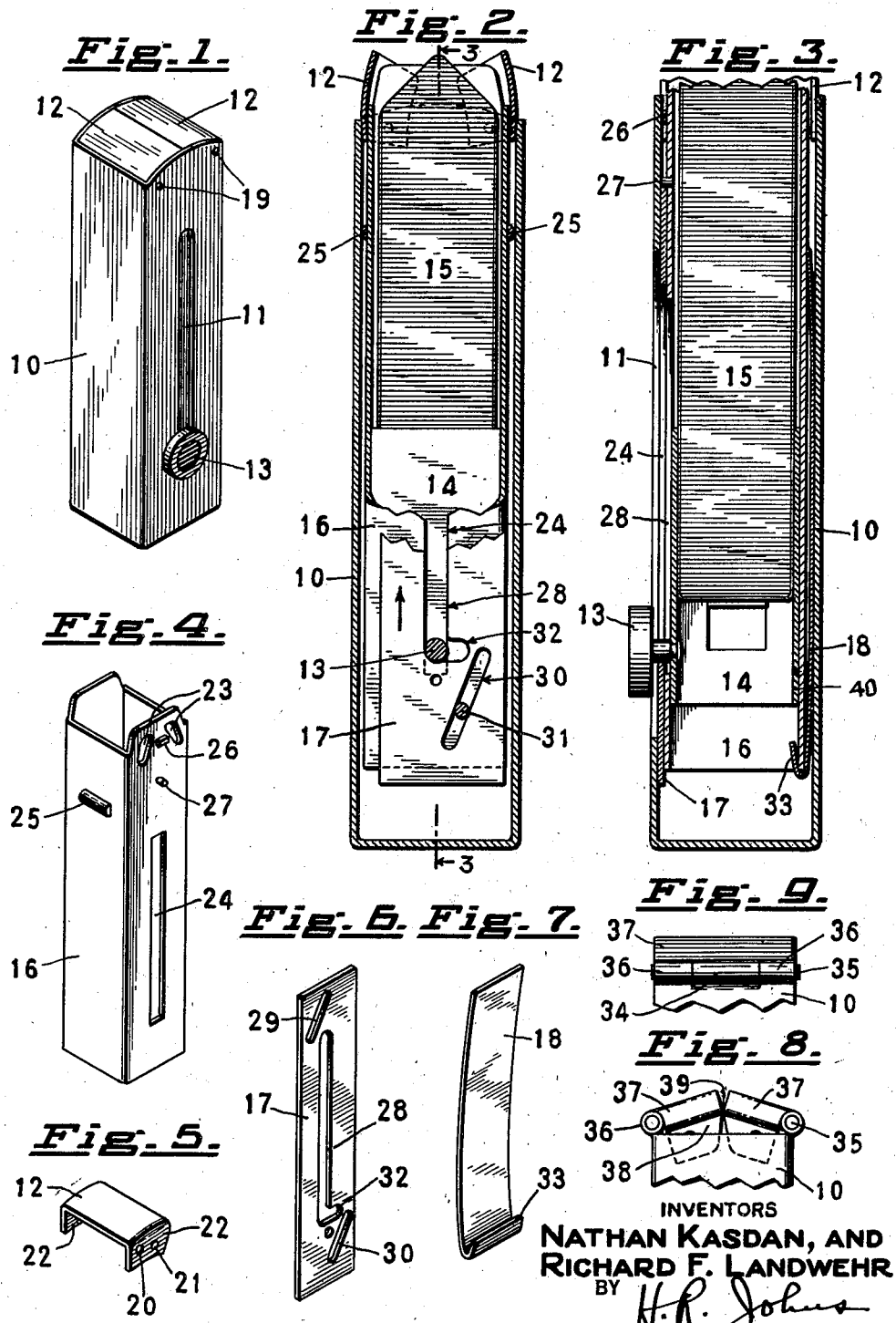

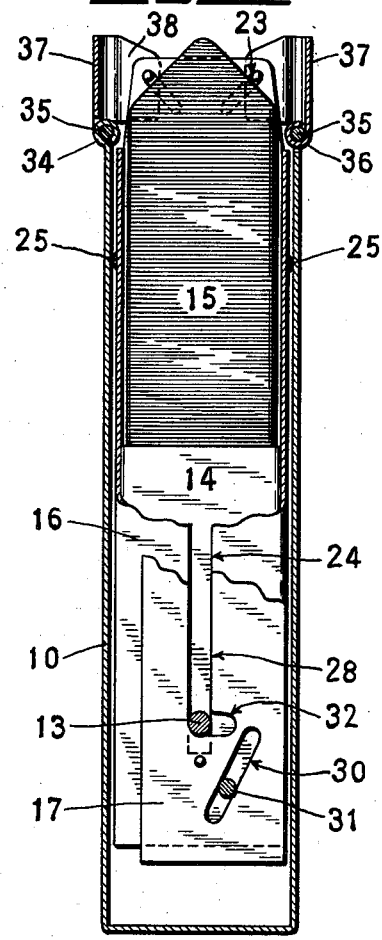

2,019,681

UNITED STATES PATENT OFFICE 2,019,681

LIP STICK HOLDER

Nathan Kasdan, New York, and Richard F. Landwehr, Laurelton, Long Island, N. Y., assignors to Majestic Metal Specialties, Inc., New York, N. Y., a corporation of New York Application August 4, 1933, Serial No. 683,594

7 Claims. (Cl. 206—56)

This invention relates to lipstick holders and the like and has for its object to provide a simple and inexpensive device of this class. Specifically the invention relates to the so-called automatic or one hand operated type of lipstick holder in which the cover is actuated by the carrier moving mechanism. Another object is to provide a device of this type in which the cover is yieldably retained in closed position.

Fig. 1 shows one embodiment of this invention.

Fig. 2 is a longitudinal section showing the covers open and the lipstick material extended.

Fig. 3 is a section along the line 3—3 of Fig. 2.

Fig. 4 is a perspective of the cover opener.

Fig. 5 is a detail of one of the covers.

Fig. 6 shows the shutter and its guide slots.

Fig. 7 is a spring which cooperates with the casing and cover opener.

Fig. 8 shows a pair of covers arranged to be yieldably held in closed position by a toggle connection constituted by the covers and their hinges.

Fig. 9 is a right side view of the device of Fig. 8 when in closed position.

Fig. 10 is a longitudinal section showing the lipstick holder of Figs. 8 and 9 with the covers raised.

An outer casing 10 is provided with a longitudinal slot 11 through which extends the actuating button 13 for the pivotal covers 12. A carrier 14 is movable longitudinally of the casing for ejecting and retracting the lipstick material 15 carried by the carrier 14. Between the casing and carrier is a cover opener tube 16 shown in detail by Fig. 4. A longitudinally and transversely shiftable shutter 17 is located between the cover opener 16 and the casing 10 for opening and closing the slot 11 with movement of the actuator 13. The spring 18 cooperates with the casing and cover opener to press the cover opener tube against the shutter.

The cover pivots 19 comprise small pins which extend through opposite sides of the casing as shown in Fig. 1 for reception in recesses 20 formed in the flanges 22 of the covers 12. Also on the flanges 22 are actuating pins 21 projecting inwardly for reception within the recesses 23 in the cover opener tube 16.

As shown in Fig. 4 the recesses 23 are widened to allow for the lateral shifting of the cover actuating pins laterally with rotation of the covers. The cover actuating tube 16 also has a longitudinal slot 24 adapted to register with the major portion of the slot 11. On opposite sides of the tube 16 are arranged spacing lugs 25 for positioning the tube 16 and providing the necessary space to receive a portion of the covers when opened. Lugs 26 on opposite sides of the tube 16 constitute a cover support and guide for the cover flanges when the cover is closed. A pin 27 secured to the tube 16 is adapted to be engaged by the top edge portion of the sliding shutter 17 so that the shutter may cause the tube 16 to be raised an amount sufficient for opening the covers.

The shutter 17 as shown in Fig. 6 is provided with a longitudinal slot 28 having a lower transversely offset portion 32, parallel inclined slots 29 engage guide pins or lugs secured to the inner face of the casing which is slotted. When the actuating pin 13 is in the bottom of the slots 11 and 24 it will at this time be within the offset portion 32 of the shutter slot so that upon raising the actuating button 13 the shutter 17 is raised and moved simultaneously upwardly and transversely due to the guide slots 29 and 30 engaging the guide pins located therein. Before the shutter 17 is moved far enough laterally for the actuating pin to come out of the offset portion 32, the shutter engages its top edge with the pin 27 and lifts the cover opener tube 16 out of the casing an amount sufficient to swing the covers open and allow the lipstick material to be ejected. As soon as the tube 16 has been raised the required amount the actuating pin 13 becomes alined with the main slot 28 by the lateral shifting and raising of the shutter. At this time the actuating pin is free to move through all three slots 11, 28 and 24 which are in registry so that the carrier may be raised further without moving the shutter or guide tube 16. In closing the covers and retracting the carrier the actuating pin is moved downward until it strikes the bottom of the slots 24 and 28 at which time the lids are swung on downward movement of the tube 16 and the shutter 17 is moved laterally and downwardly an amount sufficient to close the slot 11 in the casing 10 as the covers 12 reach closed position. When closed the cover side flanges 22 rest on the supporting lug 26.

As shown in Figs. 3 and 7 the spring 18 cooperates with the casing and with the cover opener tube 16 to press the latter against the shutter and opposite side of the casing, in order to assist in holding the tube 16 and shutter in any position.

In Figs. 8, 9 and 10 the covers may be actuated in the same manner by a cover opener tube 16. In this embodiment the covers are provided with knuckles 36 engaging the hinge pins 35 on either side of the knuckles 34 formed on the casing 10. The covers 37 are provided with side flanges 38 as before except that the covers are adapted to remain outside or on top of the casing while parts of the side flanges are received within the casing between the casing and cover opener tube 16 as shown more particularly by our prior application S. N. 592,690 filed February 13, 1932 for lipstick holder. The covers in Figs. 8, 9 and 10 may be of the same type as those shown in said application except that in addition the covers are so fitted that the side flanges contact at the points 39 in closing, the contact being first made just above the plane through the hinge pin axes so that in closing the covers are sprung to a position with these contact points 39 below such plane. In this manner the hinge pins and covers constitute a toggle joint and when the contact points 39 are below the plane through the hinge axes, the covers are yieldably retained in closed position and at the same time the carrier is yieldably retained in its lowermost position.

Among the advantages of this invention may be mentioned the toggle connection for retaining the covers and carrier in one extreme position. The outside of the casing in Fig. 1 will be found to be relatively smooth and free from indentations. The cover hinge pins 19 can be welded or soldered on the inside of the casing without being noticeable from the outside, although such pins may extend into and through the casing until flush with the outer surface. The embodiment illustrated by Fig. 1 is simpler and cheaper to construct since the stamping operations of forming the knuckles have been eliminated. The embodiment of Fig. 1, however, is not as readily adapted for the toggle action, not only because of the arched shape to the covers, but also because it is desirable that the sides of the casing adjacent the cover pivots be adapted to yield slightly during such toggle action and such yield is not as easily provided where there are no casing knuckles 34 located inwardly from the adjacent sides of the casing. Another advantage of this invention resides in the casing having a substantially square cross section so that if desired a helically slotted rotatable tube can be used in the carrier actuating mechanism as is known in the art and as is desirable where the actuator button is to be moved in an opposite direction to the movement of the carrier. The bent end to the spring 18 fits under the tube 16 and prevents the spring from riding up. The covers being entirely inside the casing when closed are protected against knocks. Where desired the carrier may also be provided with a spring 40 as illustrated to assist in retaining it in position. Of course the spring 18 must be stronger than any such carrier spring in order to keep the carrier from lowering the cover opening tube prematurely. The absence of the hinge knuckles in Fig. 1 saves about five stamping operations and the embodiment of Fig. 1 saves additional stamping operations over that described in said previous application S. N. 592,690.

The covers are raised and lowered by tube 16. In Figs. 8, 9, and 10 the covers may be actuated as described in our aforementioned previously filed application, or as are the covers of Figs. 1 to 7 inclusive of this application. The necessary yield for the toggle action of Figs. 8, 9 and 10 is provided by flexure of the sides of the casing containing the knuckles 34.

Pins 19, 21, and 31 may be formed by stamped in portions to constitute integral lugs or they may be separate pins soldered in place and either passing through the wall to which they are attached, or not passing through such wall. When the pins 19 are soldered to the inside of the casing without passing through the casing wall, as is preferable, the outside of the casing may be smooth and free from indentations and the like.

We claim:

1. A holder comprising a casing, a carrier for material movable longitudinally within the casing, an actuator for said carrier, a cover for said casing, a cover opener within the casing and a toggle means for retaining the cover in closed position, said toggle means being broken by the cover opener as the same is moved to open the cover.

2. A toilet stick holder comprising a casing, a carrier for material movable longitudinally within the casing, an actuator for the carrier, and a yieldable toggle mechanism for retaining said carrier adjacent one extreme position of its travel.

3. A holder comprising a casing, a carrier, an actuator connected to the carrier, a pair of covers pivoted adjacent opposite sides of the casing to hinge pins carried by knuckles on the casing, said covers being each provided with flanges on opposite sides, the flanges of one cover being adapted to contact with the flanges on the opposite cover in closing to form a toggle connection to yieldably retain the covers in closed position.

4. A holder comprising a casing, a carrier, a carrier actuator, a pair of covers pivoted adjacent opposite sides of the casing, each cover being mounted on a hinge pin carried by a knuckle on the casing spaced from the adjacent sides of the casing, said covers being adapted to contact in closing to form a toggle connection for yieldably retaining the covers in closed position, the spacing of said knuckles from the adjacent sides of the casing being sufficient to allow flexure and yield as the contacting portions of the covers pass through the plane containing the axes of the hinge pin.

5. A holder comprising a casing, a carrier for material movable longitudinally within the casing, an actuator for said carrier, a cover for said casing, a cover opener and a toggle means for retaining the cover in closed position, said toggle means being actuated by the cover opener.

6. A holder comprising a casing, a pair of covers, a carrier, an actuator for both the carrier and covers, a cover opener movable in response to said actuator, a resilient pivotal mounting for each cover, side flanges on the covers adapted to engage below the covers in closing to constitute a toggle mechanism for retaining the covers in closed position.

7. A holder comprising a casing, a carrier movable longitudinally within the casing, an actuator for the carrier, a cover for the casing, mechanism for opening and closing the cover from said carrier actuator, and toggle means moved by said mechanism for opening and closing the cover and retaining the same in closed position.

NATHAN KASDAN.
RICHARD F. LANDWEHR.